(12) United States Patent
Lin et al.

(10) Patent No.: US 10,642,122 B2
(45) Date of Patent: May 5, 2020

(54) FLEXIBLE LAMINATED STRUCTURE AND DISPLAY

(71) Applicant: E Ink Holdings Inc., Hsinchu (TW)

(72) Inventors: Kuan-Yi Lin, Hsinchu (TW); Yu-Wen Chen, Hsinchu (TW); Yu-Chieh Hung, Hsinchu (TW); Chun-Yu Lu, Hsinchu (TW); Chia-Chun Yeh, Hsinchu (TW); Yi-Sheng Lin, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 15/990,840

(22) Filed: May 29, 2018

(65) Prior Publication Data
US 2018/0356702 A1 Dec. 13, 2018

(30) Foreign Application Priority Data
Jun. 9, 2017 (TW) .............................. 106119215 A

(51) Int. Cl.
| G02B 26/00 | (2006.01) |
| G02F 1/167 | (2019.01) |
| B32B 3/10 | (2006.01) |
| G02F 1/16755 | (2019.01) |
| G02F 1/16756 | (2019.01) |
| G02F 1/1333 | (2006.01) |

(52) U.S. Cl.
CPC ............... *G02F 1/167* (2013.01); *B32B 3/10* (2013.01); *G02F 1/16755* (2019.01); *G02F 1/16756* (2019.01); *B32B 2457/20* (2013.01); *G02F 1/133305* (2013.01); *G02F 2201/501* (2013.01); *G02F 2202/022* (2013.01); *G02F 2202/28* (2013.01)

(58) Field of Classification Search
CPC ..... G02B 1/14; G02F 1/167; G02F 1/133305; G02F 1/133345; G02F 2201/50; G02F 2202/28; G09G 3/344; G09G 3/348; G09G 3/2003
USPC ................................ 359/242, 267, 290–297
See application file for complete search history.

(56) References Cited

U.S. PATENT DOCUMENTS

| 2008/0239188 A1 | 10/2008 | Jung et al. | |
| 2011/0235160 A1* | 9/2011 | Hsieh | G02F 1/133305 359/296 |
| 2011/0297930 A1 | 12/2011 | Choi et al. | |
| 2014/0146383 A1* | 5/2014 | Yasui | G02F 1/167 359/296 |

(Continued)

FOREIGN PATENT DOCUMENTS

| KR | 20130002528 | 1/2013 |
| TW | 201302480 | 1/2013 |
| TW | 201444680 | 12/2014 |

*Primary Examiner* — Mahidere S Sahle
(74) *Attorney, Agent, or Firm* — JCIPRNET

(57) ABSTRACT

A flexible laminated structure includes a first protective layer, a plurality of patterned structures, and a second protective layer. The patterned structures are disposed on the first protective layer and expose a portion of the first protective layer. Each of the patterned structures has a first width adjacent to the first protective layer and a second width away from the first protective layer, and the first width is smaller than the second width. The second protective layer is disposed on the first protective layer and covers the patterned structures and the first protective layer.

9 Claims, 3 Drawing Sheets

(56) References Cited

U.S. PATENT DOCUMENTS

| | | | |
|---|---|---|---|
| 2014/0192401 A1* | 7/2014 | An | G02F 1/167 359/296 |
| 2014/0346451 A1* | 11/2014 | Oh | H01L 51/5246 257/40 |
| 2017/0212625 A1* | 7/2017 | Lee | G02F 1/133345 |

* cited by examiner

FLEXIBLE LAMINATED STRUCTURE AND DISPLAY

CROSS-REFERENCE TO RELATED APPLICATION

This application claims the priority benefit of Taiwan application serial no. 106119215, filed on Jun. 9, 2017. The entirety of the above-mentioned patent application is hereby incorporated by reference herein and made a part of this specification.

BACKGROUND OF THE INVENTION

Field of the Invention

The invention relates to a laminated structure and a display, and particularly a flexible laminated structure and a display including the aforementioned flexible laminated structure.

Description of Related Art

In general, a plurality of stacked insulation material layers are disposed on a flexible display panel of a flexible display. The insulation material layers are stacked by organic material layers and inorganic material layers on top of each other, such that the components on the flexible display panel are protected from the external moisture and oxygen. However, the adherence on the interface of the organic and inorganic material layers is bad since the materials of the organic and inorganic materials layers have different properties. Thereby, a peeling effect is likely to occur between the organic and inorganic materials layers when the flexible display flexes, and the structural reliability of the display is further affected.

SUMMARY OF THE INVENTION

The invention provides a flexible laminated structure, which has a patterned structure capable of enhancing the adherence between a first protective layer and a second protective layer.

The invention provides a display including the aforementioned flexible laminated structure and thus having a better structural reliability.

The flexible laminated structure of the invention includes a first protective layer, a plurality of patterned structures, and a second protective layer. The patterned structures are disposed on the first protective layer and expose a portion of the first protective layer. Each of the patterned structures has a first width adjacent to the first protective layer and a second width away from the second protective layer, and the first width is smaller than the second width. The second protective layer is disposed on the first protective layer and covers the patterned structures and the first protective layer.

In an embodiment of the invention, each of the aforementioned patterned structures includes a first pattern structure and a second pattern structure. The first pattern structure is located between the second pattern structure and the first protective layer. The first pattern structure has the first width, and the second pattern structure has the second width.

In an embodiment of the invention, a material of the aforementioned first pattern structure is a silicon oxide. A material of the second pattern structure is a silicon nitride.

In an embodiment of the invention, a material of each of the aforementioned patterned structures is a silicon oxynitride. An oxygen content of the silicon oxynitride gradually reduces from a side adjacent to the first protective layer to another side away from the first protective layer.

In an embodiment of the invention, a material of each of the aforementioned patterned structures is a silicon oxynitride. A nitrogen content of the silicon oxynitride gradually reduces from a side adjacent to the first protective layer to another side away from the first protective layer.

The display of the invention includes a flexible display unit and a flexible laminated structure. The flexible laminated structure is disposed on the flexible display unit. The flexible laminated structure includes a first protective layer, a plurality of patterned structures, and a second protective layer. The patterned structures are disposed on the first protective layer and expose a portion of the first protective layer. Each of the patterned structures has a first width adjacent to the first protective layer and a second width away from the first protective layer, and the first width is smaller than the second width. The second protective layer is disposed on the first protective layer and covers the patterned structures and the first protective layer.

In an embodiment of the invention, each of the aforementioned patterned structures includes a first pattern structure and a second pattern structure. The first pattern structure is located between the second pattern structure and the first protective layer. The first pattern structure has the first width, and the second pattern structure has the second width.

In an embodiment of the invention, a material of the aforementioned first pattern structure is a silicon oxide. A material of the second pattern structure is a silicon nitride.

In an embodiment of the invention, a material of each of the aforementioned patterned structures is a silicon oxynitride. An oxygen content of the silicon oxynitride gradually reduces from a side adjacent to the first protective layer to another side away from the first protective layer.

In an embodiment of the invention, a material of each of the aforementioned patterned structures is a silicon oxynitride. A nitrogen content of the silicon oxynitride gradually reduces from a side adjacent to the first protective layer to another side away from the first protective layer.

In an embodiment of the invention, the aforementioned flexible display unit is an electrophoretic display panel.

Based on the above, the flexible laminated structure of the invention has patterned structures. Each of the patterned structures has a width adjacent to the first protective layer and a width away from the first protective layer, and the width adjacent to the first protective layer is smaller than the width away from the first protective layer. As a result, an adherence between the second protective layer and the first protective layer is enhanced and the occurrence of peeling effect is reduced. Moreover, the display of the invention also includes the aforementioned flexible laminated structure and thus has a better structural reliability.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
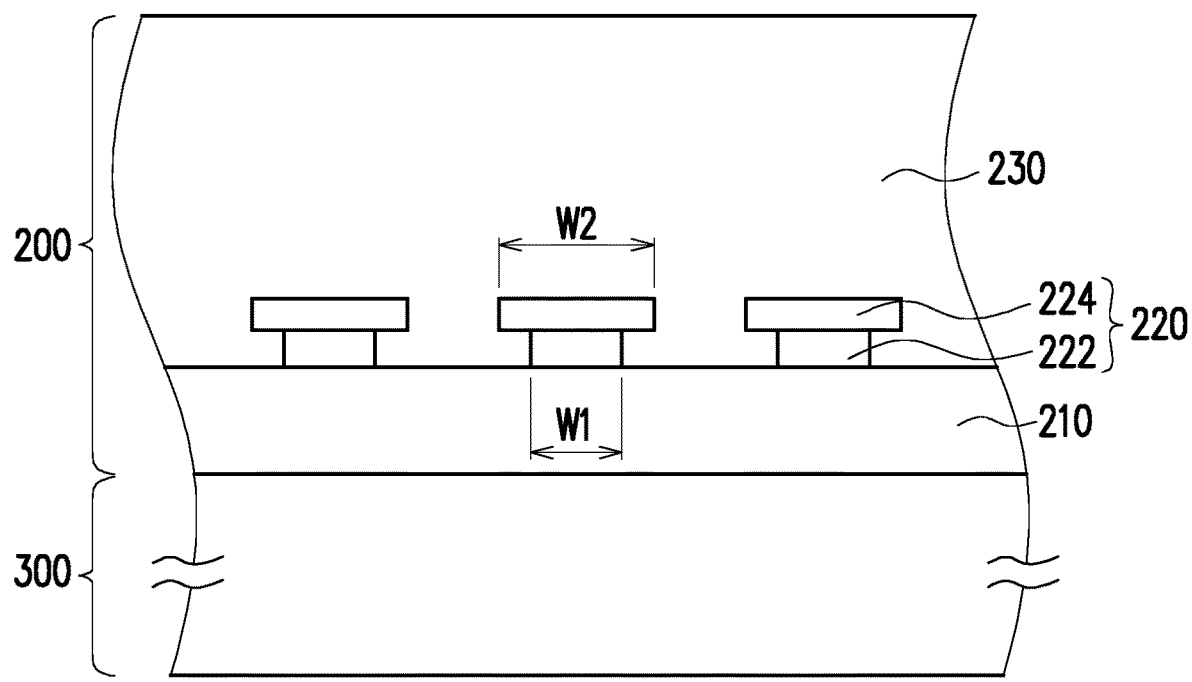
FIG. 1 is a schematic cross-sectional view of a portion of a display in an embodiment of the invention.

FIG. 1 is a schematic cross-sectional view of a portion of a display in an embodiment of the invention. Referring to FIG. 1, a display 100 of this embodiment includes a flexible laminated structure 200 and a flexible display unit 300. The flexible laminated structure 200 is disposed on the flexible display unit 300. Herein, the flexible display unit 300 is, for example, an electrophoretic display panel but the invention is not limited thereto.

More specifically, the flexible laminated structure 200 of the display 100 of this embodiment includes a first protective layer 210, a plurality of patterned structures 220, and a second protective layer 230. The first protective layer 210 is disposed on the flexible display unit 300 and directly contacts a surface of the flexible display member unit 300. The patterned structures 220 are disposed on the first protective layer 210 and expose a portion of the first protective layer 210. Each of the patterned structures 220 has a first width W1 adjacent to the first protective layer 210 and a second width W2 away from the first protective layer 210, and the first width W1 is smaller than the second width W2. The second protective layer 230 is disposed on the first protective layer 210 and covers the patterned structures 220 and the first protective layer 210.

Again referring to FIG. 1, a material of the first protective layer 210 of this embodiment is, for example, a silicon nitride but the invention is not limited thereto. The patterned structures 220 include a first pattern structure 222 and a second pattern structure 224. The first pattern structure 222 is located between the second pattern structure 224 and the first protective layer 210. The first pattern structure 222 has the first width W1, and the second pattern structure 224 has the second width W2. Here, a material of the first pattern structure 222 is, for example, a silicon oxide. A material of the second pattern structure 224 is, for example, a silicon nitride.

In a manufacturing process, a layer of silicon oxide layer (not depicted) is first deposited on the first protective layer 210. The silicon oxide layer completely covers the first protective layer 210. Then, a layer of silicon nitride layer (not depicted) is deposited on the silicon oxide layer. The silicon nitride layer completely covers the silicon oxide layer and the silicon oxide layer is located between the silicon nitride layer and the first protective layer 210. Following, an etching process is performed on the silicon nitride layer through dry etching to form a patterned silicon nitride layer. Later, an etching process is performed on the silicon oxide layer located beneath the patterned silicon nitride layer through wet etching using the patterned silicon nitride layer as an etching mask so as to form a patterned silicon oxide layer. Here, the patterned silicon nitride layer and the patterned silicon oxide layer define a plurality of patterned structures 220 separated from one another. Each of the patterned structures 220 consists of the first pattern structure 222 (defined by the patterned silicon oxide layer) having the first width W1 and the second pattern structure 224 (defined by the patterned silicon nitride layer) having the second width W2. The first width W1 differs from the second width W2 since the first pattern structure 222 and the second pattern structure 224 are formed by different materials and in different etching methods. Here, the first width W1 is smaller than the second width W2 but the invention is not limited thereto.

Since each of the patterned structures 220 includes the first pattern structure 222 and the second pattern structure 224 of different widths and the first width W1 of the first pattern structure 222 is smaller than the second width W2 of the second pattern structure 224, a cross-section of each of the patterned structures 220 is, for example, in an undercut shape of T as shown in FIG. 1 but the invention is not limited thereto. A contact area of the second protective layer 230 and each of the patterned structures 220 is increased through the aforementioned structural feature of the patterned structures 220, such that an adherence between the second protective layer 230 and the first protective layer 210 is enhanced. Thereby, the second protective layer 230 and the first protective layer 210 of the flexible laminated structure 200 are unlikely to separate from each other when the display 100 of this embodiment is flexed, and an occurrence of the peeling effect is further reduced. In brief, the display 100 of this embodiment has a better structural reliability.

It should be noted here that the reference numerals for components and part of the content of the previous embodiment are continually applied in following embodiments. Identical reference numerals are used to show identical or similar components and the descriptions on identical technical content are omitted. Please refer to the previous embodiment for the omitted descriptions for they are not repeated again in the following embodiments.

Figure 2:
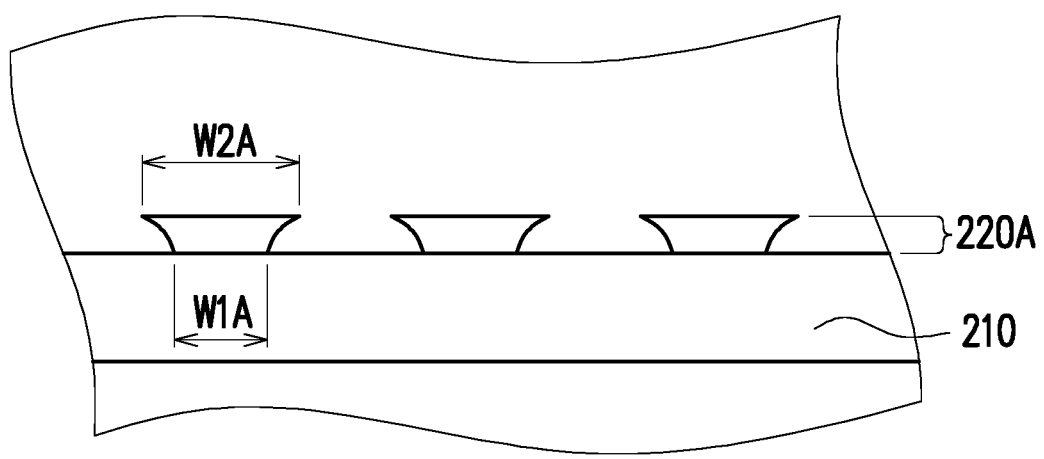
FIG. 2 is a schematic cross-sectional view of a portion of a flexible laminated structure in an embodiment of the invention.

FIG. 2 is a schematic cross-sectional view of a portion of a flexible laminated structure in an embodiment of the invention. Referring to FIG. 1 and FIG. 2 together, a flexible laminated structure 200A of this embodiment is similar to the flexible laminated structure 200 of FIG. 1. Major differences between the two flexible laminated structures lie in: a material of each of patterned structures 220A of the flexible laminated structure 200A of this embodiment is a silicon oxynitride, and an oxygen content of the silicon oxynitride gradually reduces from a side adjacent to the first protective layer 210 to another side away from the first protective layer 210. That is to say, the patterned structures 220A of this embodiment is a grading material structure.

In a manufacturing process, a layer of silicon oxynitride is first deposited on the first protective layer 210 of the flexible laminated structure 200A of this embodiment. An oxygen content of the silicon oxynitride gradually reduces from the side adjacent to the first protective layer 210 to another side away from the first protective layer 210. Later, an etching process is performed on the silicon oxynitride through wet etching. An etching rate of the silicon oxynitride is higher on the side with a higher oxygen content than on the side with a lower oxygen content. Thereby, each of the formed patterned structures 220A has a first width W1A adjacent to the first protective layer 210 and a second width W2A away from the first protective layer 210, and the first width W1A is smaller than the second width W2A. Here, a width of each of the patterned structures 220A gradually reduces from the second width W2A to the first width W1A in a direction from a side away from the first protective layer 210 to a side adjacent to the first protective layer 210, such that a cross-section of each of the patterned structures 220A is, for example, similar to an undercut shape of an inverted trapezoid but the invention is not limited thereto.

Figure 3:
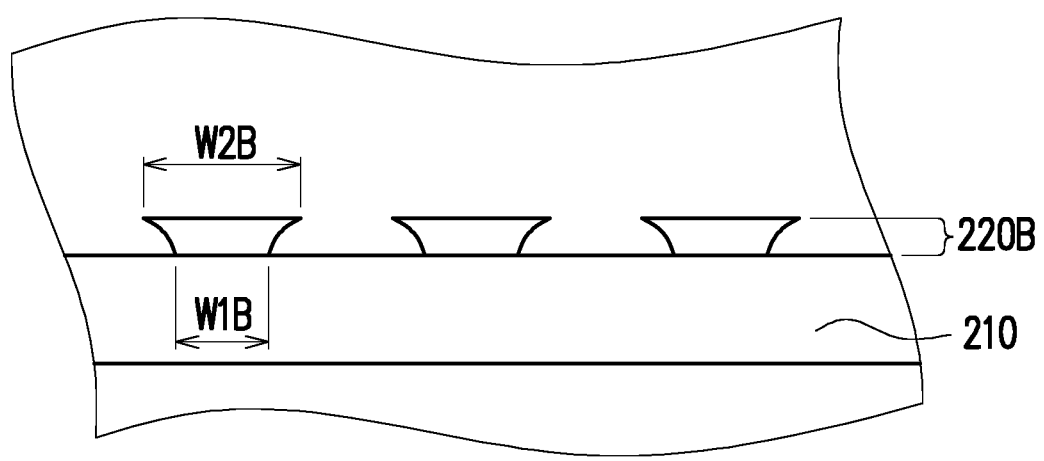
FIG. 3 is a schematic cross-sectional view of a portion of a flexible laminated structure in another embodiment of the invention.

FIG. 3 is a schematic cross-sectional view of a portion of a flexible laminated structure in another embodiment of the invention. Referring to FIG. 2 and FIG. 3 together, a flexible laminated structure 200B of this embodiment is similar to the flexible laminated structure 200A of FIG. 2. A major difference between the two flexible laminated structures lies in: a material of each of patterned structures 220B of the flexible laminated structure 200B of this embodiment is a silicon oxynitride, and a nitrogen content of the silicon oxynitride gradually reduces from a side adjacent to the first protective layer 210 to another side away from the first protective layer 210. That is to say, the patterned structures 220B of this embodiment is a grading-material structure.

In a manufacturing process, a layer of silicon oxynitride is first deposited on the first protective layer 210 of the flexible laminated structure 200B. A nitrogen content of the silicon oxynitride gradually reduces from a side adjacent to the first protective layer 210 to another side away from the first protective layer 210. Later, an etching process is performed on the silicon oxynitride through dry etching. An etching rate of the silicon oxynitride is higher on the side with a higher nitrogen content than on the side with a lower nitrogen content. Thereby, each of the formed patterned structures 220B has a first width W1B adjacent to the first protective layer 210 and a second width W2B away from the first protective layer 210, and the first width W1B is smaller than the second width W2B. Here, a width of each of the patterned structures 220B gradually reduces from the second width W2B to the first width W1B in a direction from a side away from the first protective layer 210 to a side adjacent to the first protective layer 210, such that a cross-section of each of the patterned structures 220B is, for example, similar to an undercut shape of an inverted trapezoid but the invention is not limited thereto.

The first widths W1A and W1B of each of the patterned structures 220A and 220B are smaller than the second widths W2A and W2B of each of the patterned structures 220A and 220B, and thus the cross-section of each of the patterned structures 220A and 220B is in an undercut shape of an inverted trapezoid, thereby a contact area of the second protective layer 230 and each of the patterned structures 220A and 220B is increased. Particularly, an adherence between the second protective layer 230 and the first protective layer 210 is enhanced when the second protective layer 230 covers and directly contacts each of the patterned structures 220A and 220B and exposes a portion of the first protective layer 210, and a structural reliability of the flexible laminated structures 200A and 200B is further enhanced accordingly.

It should be noted that the invention does not limit the structural forms of the flexible laminated structures 200, 200A, and 200B. All forms are protected under the scope of this invention as long as the patterned structures 220, 220A, and 220B of the flexible laminated structures 200, 200A, and 200B have first widths W1, W1A, and W1B adjacent to the first protective layer 210 and second widths W2, W2A, and W2B away from the first protective layer 210, and each of the first widths is smaller than each of the second widths.

In conclusion of the above, the flexible laminated structure of the invention has patterned structures. Each of the patterned structures has a first width adjacent to the first protective layer and a second width away from the first protective layer, and the first width is smaller than the second width, thereby an adherence between the second protective layer and the first protective layer is enhanced and an occurrence of peeling effect is reduced. Moreover, the display of the invention includes the aforementioned flexible laminated structure and thus has a better structural reliability.

It will be apparent to those skilled in the art that various modifications and variations can be made to the disclosed embodiments without departing from the scope or spirit of this invention. In view of the foregoing, it is intended that the invention covers modifications and variations provided that they fall within the scope of the following claims and their equivalents.

What is claimed is:

1. A flexible laminated protective structure externally disposed on a flexible display unit, comprising:
    a first protective layer disposed on the flexible display unit;
    a plurality of patterned structures, directly disposed on the first protective layer and exposing a portion of the first protective layer, wherein each of the plurality of patterned structures has a first width adjacent to the first protective layer and a second width away from the first protective layer, the first width is smaller than the second width; and
    a second protective layer, directly disposed on the plurality of patterned structures and the first protective layer, wherein the attachment of the second protective layer to the first protective layer is increased by the plurality of patterned structures, and
    wherein each of the patterned structures comprises a first pattern structure and a second pattern structure, the first pattern structure is located between the second pattern structure and the first protective layer, the first pattern structure has the first width, and the second pattern structure has the second width, and a material of the first patterned structure is different from a material of the second patterned structure.

2. The flexible laminated structure as recited in claim 1, wherein a material of the first pattern structure is a silicon oxide, and a material of the second pattern structure is a silicon nitride.

3. The flexible laminated structure as recited in claim 1, wherein a material of each of the patterned structures is a silicon oxynitride, and an oxygen content of the silicon oxynitride gradually reduces from a side adjacent to the first protective layer to another side away from the first protective layer.

4. The flexible laminated structure as recited in claim 1, wherein a material of each of the patterned structures is a silicon oxynitride, and a nitrogen content of the silicon oxynitride gradually reduces from a side adjacent to the first protective layer to another side away from the first protective layer.

5. A display, comprising:
    a flexible display unit; and
    a flexible laminated protective structure, externally disposed on the flexible display unit, the flexible laminated structure comprising:
        a first protective layer disposed on a flexible display unit;
        a plurality of patterned structures, directly disposed on the first protective layer and exposing a portion of the first protective layer, wherein each of the plurality of patterned structures has a first width adjacent to the first protective layer and a second width away from the first protective layer, the first width is smaller than the second width; and
        a second protective layer, directly disposed on the plurality of patterned structures and the first protective layer, wherein the attachment of the second protective layer to the first protective layer is increased by the plurality of patterned structures, and
wherein each of the patterned structures comprises a first pattern structure and a second pattern structure, the first pattern structure is located between the second pattern structure and the first protective layer, the first pattern structure has the first width, and the second pattern structure has the second width, and a material of the first patterned structure is different from a material of the second patterned structure.

6. The display as recited in claim 5, wherein a material of the first pattern structure is a silicon oxide, and a material of the second pattern structure is a silicon nitride.

7. The display as recited in claim 5, wherein a material of each of the patterned structures is a silicon oxynitride, and an oxygen content of the silicon oxynitride gradually reduces from a side adjacent to the first protective layer to another side away from the first protective layer.

8. The display as recited in claim 5, wherein a material of each of the patterned structures is a silicon oxynitride, and a nitrogen content of the silicon oxynitride gradually reduces from a side adjacent to the first protective layer to another side away from the first protective layer.

9. The display as recited in claim 5, wherein the flexible display unit is an electrophoretic display panel.

\* \* \* \* \*